United States Patent [19]

Mainiero

[11] E Re. 30,814

[45] Reissued Dec. 8, 1981

[54] APPARATUS AND METHOD FOR FORMING BARBED TAPE

[75] Inventor: Michael R. Mainiero, Monroe, Conn.

[73] Assignee: Man Barrier Corporation, Seymour, Conn.

[21] Appl. No.: 48,072

[22] Filed: Jun. 13, 1979

Related U.S. Patent Documents

Reissue of:

[64] Patent No.: 4,028,925
Issued: Jun. 14, 1977
Appl. No.: 679,326
Filed: Apr. 22, 1976

[51] Int. Cl.[3] ..... B21F 25/00; B21D 28/04

[52] U.S. Cl. ..... 72/294; 72/307; 72/308; 72/335; 29/7.2

[58] Field of Search ..... 140/58, 66; 29/7.1, 29/7.2; 113/116 A, 116 F, 116 HA; 228/142; 72/294, 295, 298, 300, 301, 309, 310, 307, 308, 335, 383

[56] References Cited

U.S. PATENT DOCUMENTS

| | | | |
|---|---|---|---|
| 704,521 | 7/1902 | Dolan et al. | 72/310 |
| 1,040,745 | 10/1912 | Olson | 72/310 |
| 2,948,049 | 8/1960 | Wilson | 140/58 |
| 3,916,958 | 11/1975 | Uhl | 140/58 |

*Primary Examiner*—Lowell A. Larson
*Attorney, Agent, or Firm*—Hayes & Reinsmith

[57] ABSTRACT

A machine having blanking, barb forming and bending stations is provided for making a coil of metal tape from a substantially planar linear strip of metal stock wherein such strip is fed in sequence to the stations in a single pass through the machine to respectively edge notch the strip into barbs, upset the barbs into inclined relation to the plane of the strip and then edge bend the strip in the plane of the strip to form it into identically angularly displaced adjoining linear segments of equal length to make a generally annular coil of barbed metal tape.

The method of this invention features forming spaced openings along a longitudinal axis of a substantially planar linear strip of metal stock, positioning the strip by means of its openings and edge bending the strip in the plane of the strip adjacent its openings to form the strip into a coil having identical angularly displaced adjoining linear segments.

48 Claims, 17 Drawing Figures

APPARATUS AND METHOD FOR FORMING BARBED TAPE

Matter enclosed in heavy brackets [ ] appears in the original patent but forms no part of this reissue specification; matter printed in italics indicates the additions made by reissue.

This invention generally relates to barbed tape formed in a helical coil and usable, e.g., as an anti-personnel barrier and the like.

A primary object of this invention is to provide a new and improved machine which is of significantly simplified construction for making a coil of metal tape in a highly efficient, low cost mass production operation with the resulting product being a closely compacted helical coil collapsible into nested relation with adjoining turns of the coil for expedient storage and handling and which is suited to be paid-out in an extended condition for maximum effectiveness in field use, e.g., as an anti-personnel barrier.

Another object of this invention is to provide such a machine characterized by ease of service and a minimum number of operating components which provide long term accuracy for reliable high production operation over an extended period of time.

A further object of this invention is to provide a machine having in-line work performing stations through which strip stock is driven in a single pass to form a helical coil of barbed tape.

A yet further object of this invention is to provide a machine of the above described type which features a strip clamping and bending tool for deforming a generally planar linear barbed strip into identical adjoining segments each of which are angularly displaced in the plane of the strip relative to its trailing segment at a precisely uniform bend angle to form a coil of prescribed specifications.

Yet another object of this invention is to provide such a machine which is readily adjustable for providing such edge bending of the barbed tape to selected bend angles while yet ensuring precisely uniform turns of coil with linear segments of identical construction.

A primary object of this invention is to provide a new and improved method of making metal tape from a substantially planar linear strip of flat metal stock into a continuous series of identical angularly displaced linear segments which form a compact helical coil and which is particularly suited to make such a coil unit in a sequence of steps which assure a highly reliable, low cost, mass production operation.

Another object of this invention is to provide a method of the above described type wherein the strip stock upon being edge notched and formed to provide barb clusters on opposite strip edges in reversely oriented relation to one another may be edge bent in the plane of the strip in a precision process of this invention to form uniform linear tape segments of identical construction and angularly offset at identical bend angles for optimizing nesting of a continuous series of closed loops in a helical coil while yet providing for quick and easy pay-out of such a coil into an extended condition for use as, e.g., an anti-personnel barrier.

A further object of this invention is to provide a method of the above described type wherein the disclosed techniques are particularly suited for use with a variety of flat metal strip stock for forming such stock from a linear configuration into a coil of prescribed dimensions and specifications in a high quality end product wherein adjoining segments are of uniform identical construction for compact nesting as well as for assuring a helical coil tape unit which is readily handled and is particularly suited to resist deformation even though the tape when installed is subjected to rugged and demanding applications over extended periods of time.

Other objects will be in part obvious and in part pointed out more in detail hereinafter.

A better understanding of this invention will be obtained from the following detailed description and the accompanying drawings of illustrative applications of the invention.

Figure 1:
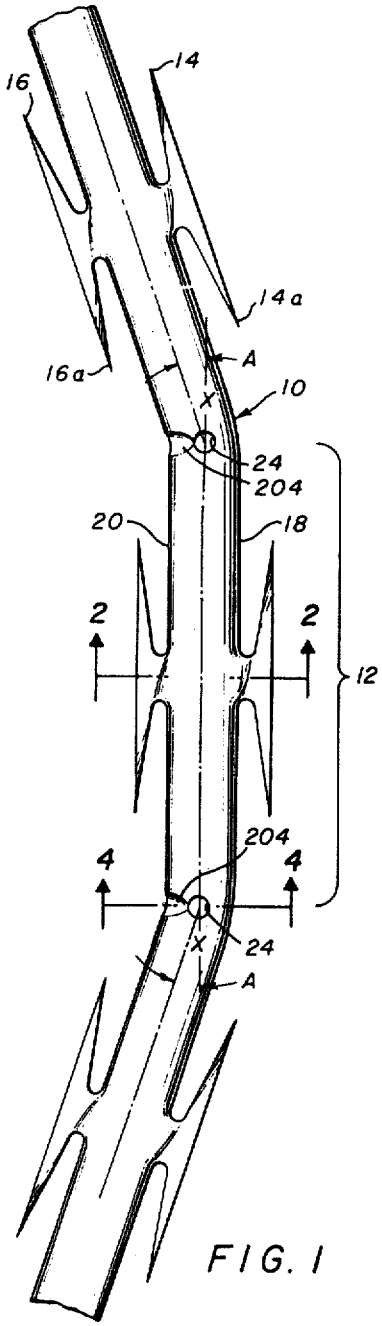
FIG. 1 is a plan view, partly broken away, showing a tape formed by a machine and method of this invention.
Figure 2:
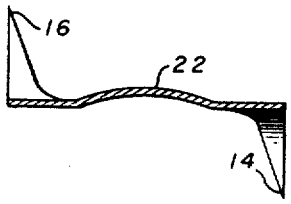
FIG. 2 is an enlarged section view taken along line 2—2 of FIG. 1.

Referring to the drawings in detail, barbed tape 10 is illustrated in FIGS. 1–4 which tape is made by a machine and method of this invention from substantially planar, linear flat metal strip stock. Tape 10 to be formed is one having a continuous series of closed loops defining a helical coil with each closed loop or turn having adjoining equiangularly offset linear segments 12 of equal length. Each turn of the coil must be so formed as to be readily collapsed or nested in stacked confronting relation to adjacent turns. The tape 10 has barb clusters each providing four needle-sharp barbs with each four-barb cluster having two barb pairs 14, 14a and 16, 16a spaced opposed along opposite tape edges 18 and 20.

For example, each barb pair may be about 2⅜ inch long and equally spaced apart on 4-inch centers repeatedly along the length of tape 10 dimensioned, e.g., to be 0.025 inch thick and 1.195 inch wide at the maximum width of the tape across barbs and fabricated for general purpose use, say with 24 and 30 inch diameter turns. Such tape may be fabricated from flat strip stock of high carbon steel and even with austenetic stainless steel 0.025 inch thick, e.g., hardened to Rockwell 30 N, 50–70.

Figure 3:
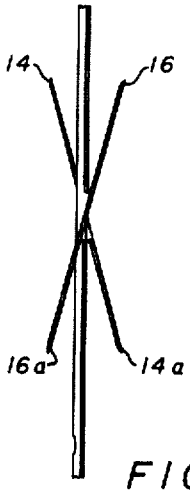
FIG. 3 is a side elevational view, partly broken away, of the tape of FIG. 1.
Figure 4:
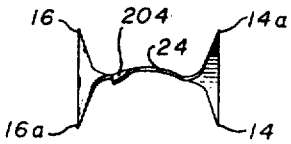
FIG. 4 is a section view taken along line 4—4 of FIG. 1.

Barbs of each pair 14, 14a and 16, 16a respectively extend in opposite directions longitudinally of tape 10 with barb pair 14, 14a of each cluster reversely oriented to barb pair 16, 16a in inclined relation to the plane of tape 10 (FIG. 3). Tape 10 is preferably also fabricated to provide a crown 22 in the plane of tape 10 such that the finished tape in cross section (FIG. 2) curves to promote nesting of stacked turns when tape 10 is collapsed as well as to resist deformation when installed in extended condition, for example, as an anti-personnel barrier.

An edge tape bending technique featured in this invention assures that the barb clusters are positioned in precise corresponding relation to each other on each turn of the coil such that the linear segments 12 and their barb clusters of each turn lie flat in face-to-face relation to the corresponding elements of adjacent turns on their entirety and nest in an axially aligned arrangement when the coil is collapsed.

To make such a barbed tape which may be readily fabricated, even from resilient spring steel, in an efficient high production, low cost operation to form a helical coil of maximum effectiveness, the linear strip stock after being edge notched with oriented barbs is shaped into identical segments with each segment being edge bent relative to its adjoining segments. In the machine and method of this invention, openings or holes 24 are located precisely midway between adjacent barb clusters with the holes 24 each being equally spaced apart, circular in shape with uniformly controlled diameter and located on a central or major longitudinal axis X—X of the tape 10. Such construction not only provides relief for deformation of tape 10 into a closed loop incident to edge bending of tape 10 adjacent each of its holes 24 along a transverse line intersecting the hole 24 without tearing, but additionally work hardens the bent section of tape 10 and also serves to pilot indexing movements of the following tape through machine 26.

To fabricate such tape 10 in accordance with this invention, an embodiment of machine 26 incorporating this invention is illustrated as a conventional automatic in-line machine which includes a power operated double crank press ram 28 supported on a machine frame 30. Strip stock 32 is fed preferably from a payoff reel, not shown, downstream into progressive aligned work performing stations simultaneously power operated in timed relation to up and down stroking movements of press ram 28 supported on frame 30 for reciprocation normal to a linear path of movement of strip stock 32 through machine 26.

An upstream blanking station 34 edge notches barb clusters onto strip 32. An intermediate forming station 36 crowns the blanked strip and upsets each barb such that the leading and trailing barbs of each barb pair 14, 14a and 16, 16a are aligned with other barb pairs along a common edge of tape 10 and are in reversely oriented inclined relation to the other barb pair of its cluster on the opposite edge of tape 10. A downstream clamping and bending station 38 precisely edge bends the barbed tape into identical segments 12 of equal length which are each offset at an exact bend angle relative to its trailing segment 12 to form the tape 10 into an annular coil having a continuous succession of identical adjoining segments 12. The edge bent segments 12 of the completely formed tape 10 advance beyond the clamping and bending station 38 onto a cone 40 of a takeup reel 42 which receives tape 10 and ensures it being stacked into an aligned collapsed coil of closed loops.

It will be understood that a turntable 43 is power operated intermittently in timed relation to indexing movements of an indexing drive 44 for the strip stock 32. These intermittent rotary movements imparted to the takeup reel 42 are synchronized by limit switch LS-8 which is operated by a timing cam on rotary shaft 41 of the press to signal a control circuit, not shown, to start the reel 42 rotating upon strip advance, and by limit switch LS-7 which is located at the base of reel 42 and is cam operated to stop reel rotation upon termination of the strip stock advance.

Figure 5:
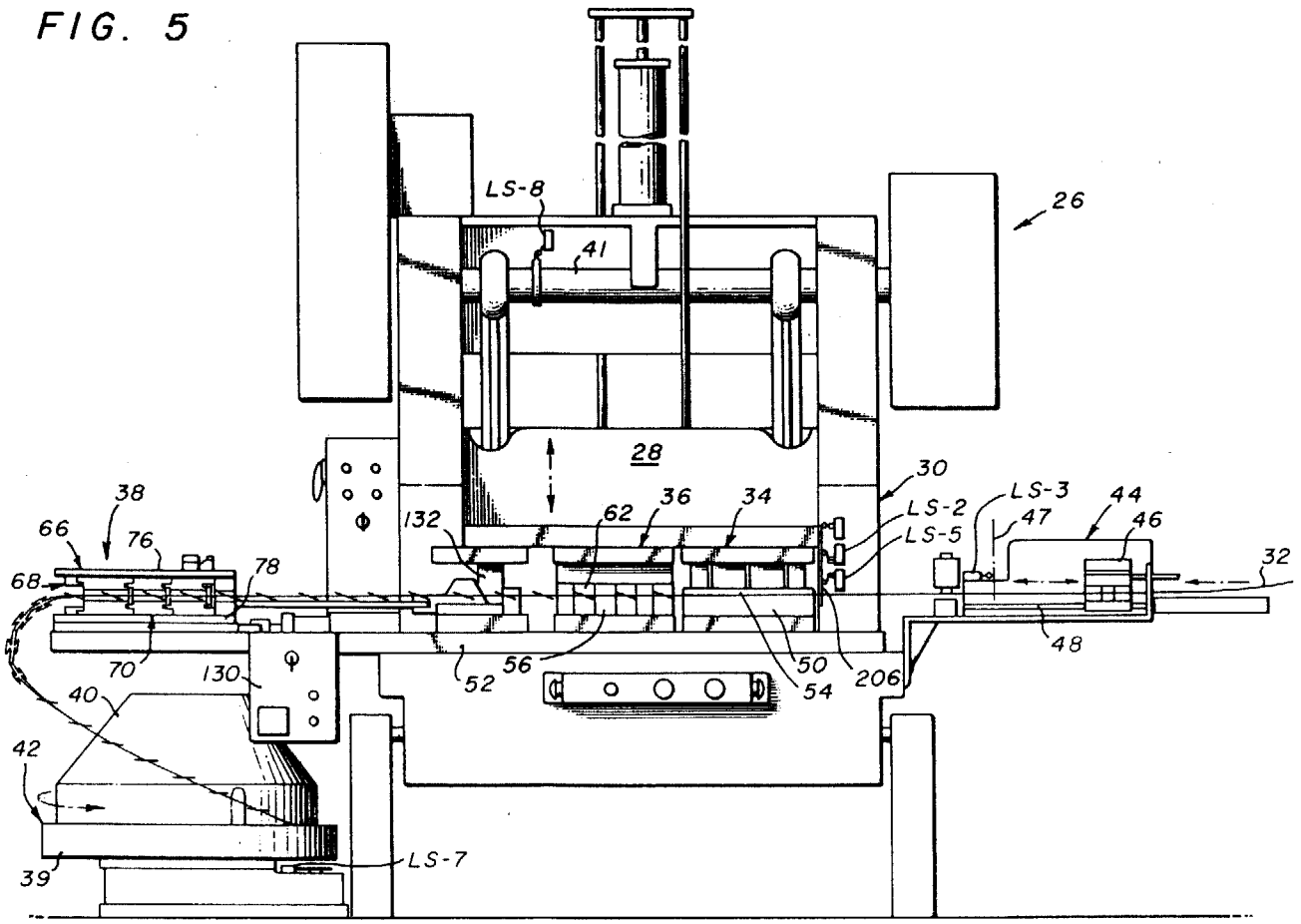
FIG. 5 is a side elevational view schematically showing an exemplary machine embodying this invention for blanking, forming and bending flat strip stock into tape of the type shown in FIG. 1 to provide a helical coil of barbed tape in accordance with this invention.

More specifically, the indexing drive 44 is provided with a strip clamping and indexing head 46 supported on a pair of shafts such as the one shown at 48 fixed relative to frame 30 of machine 26. The head 46 is mounted for horizontal reciprocating movement by any conventional power operating means, between its illustrated ready clamp position and a downstream strip release position denoted by line 47. For purposes of this invention, it will suffice to understand that the strip clamping and indexing head 46 may be operated in a well-known manner to close upon and clamp strip stock 32 in its illustrated upstream ready clamp position prior to advancing the stock to the left as viewed in FIG. 5 toward its downstream strip release position 47. Such action clamps and pulls stock 32 off the payoff reel and advances the clamped strip a predetermined distance from the ready clamp position of head 46 with a pushing motion downstream into the in-line progressive stations 34, 36 and 38 along a linear horizontal path through machine 26. Upon reaching strip release position 47, the strip clamping and indexing head 46 engages a limit switch LS-3 and effects strip release and return of head 46 to its illustrated ready clamp position in readiness for the next cycle, providing an idle return and a dwell for indexing drive 44.

Figure 6:
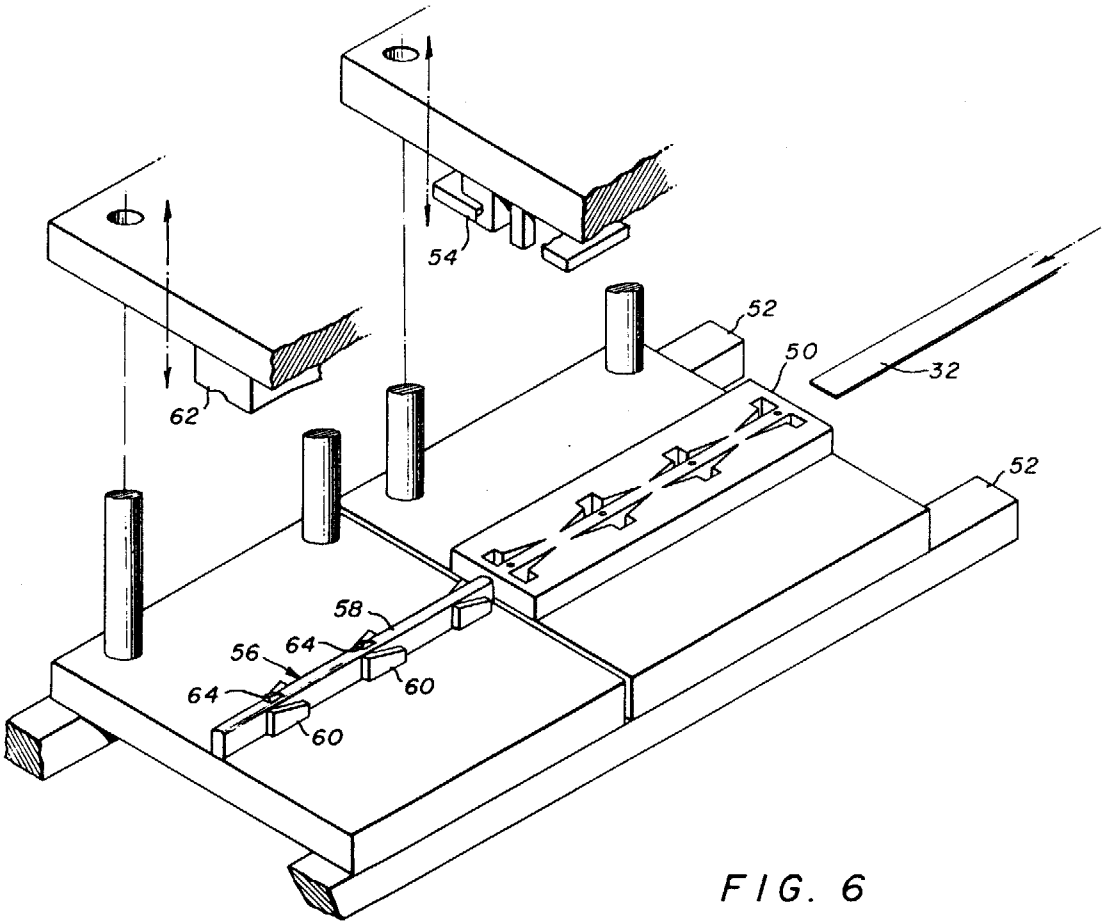
FIG. 6 is an enlarged isometric view, partly broken away and partly in section, of a blanking station and a forming station of the machine of FIG. 5.

Upon reaching blanking station 34, strip stock 32 is provided bearing support along a female blanking die 50 (FIG. 6) fixed on a pair of support rails, 52, 52 extending lengthwise of and secured to machine frame 30 in underlying relation to a matching movable male die 54 drivingly connected to and power operated by the vertically reciprocable press ram 28. During dwells between indexing drive movements, the press operates and movable male die 54 is driven downwardly into a lower operative position responsive to a downstroke of press ram 28 to close on the fixed blanking die 50 and to shear off opposite strip edges to form a plurality of spaced four-barb clusters.

While the number of barb clusters formed during each machine cycle may vary, in the specifically illustrated embodiment, the strip stock 32 may be advanced 12 inches per cycle. Three four-barb clusters are blanked each cycle on 4-inch centers with four pilot indexing and bend forming holes 24 being simultaneously formed per cycle with each hole 24 being located precisely midway between adjacent barb clusters. The holes 24 are pierced in the blanking station 34.

Upon return of the movable male die 54 into its raised inoperative position responsive to an upstroke of press ram 28, the blanked strip advances downstream during the next indexing movement of head 46 and into position onto a longitudinally extending forming die 56 fixed on rails 52 of machine frame 30. In the embodiment illustrated, this strip stock advance moves the strip downstream one foot to precisely position the trailing strip in the blanking station 34 in following relation on four inch centers to match the preceding three clusters of barbs in the forming station 36.

Fixed forming die 56 has a crowned tape support rail 58 and barb upsetting dies such as at 60 secured in precision spaced relation on sides of rail 58 to provide the desired inclination of the leading and trailing barbs of each barb pair. These barb upsetting dies 60 and crowned tape support rail 58 correspond to complementary elements of a movable forming die member 62 supported for vertical reciprocating movement toward and away from fixed forming die 56 to crown tape 10 to provide its curved cross section and to upset each barb of each of the three four-barb clusters positioned in forming station 36 upon movable forming die 62 being driven by press ram 28 downwardly into a fully extended position illustrated in FIG. 5.

Forming station 36 preferably is provided with suitable tape lifting means such as spring loaded fingers 64 which raise the tape 10 from rail 58 upon opening die 62 whereby the tape 10 may be readily advanced during the following indexing movement of the tape through the machine 26 at a selected height.

Upon return of movable forming die 62 into open position on the press upstroke, the stiffness of the strip stock 32 ensures that it will be advanced axially from forming station 36 along the linear strip feed path and onto an aligned downstream guide rail, not shown, to be fed into clamping and bending station 38. The guide rail will be understood to extend between forming station 36 and clamping and bending station 38 at a height corresponding to that of tape 10 upon its being raised by fingers 64 off rail 58. Tape guidance and alignment is maintained along the guide rail by suitable adjustable brackets, not shown, for selectively establishing a predetermined clearance with the top of the guide rail through which clearance the tape 10 is fed to the clamping and bending station 38.

Figure 8:
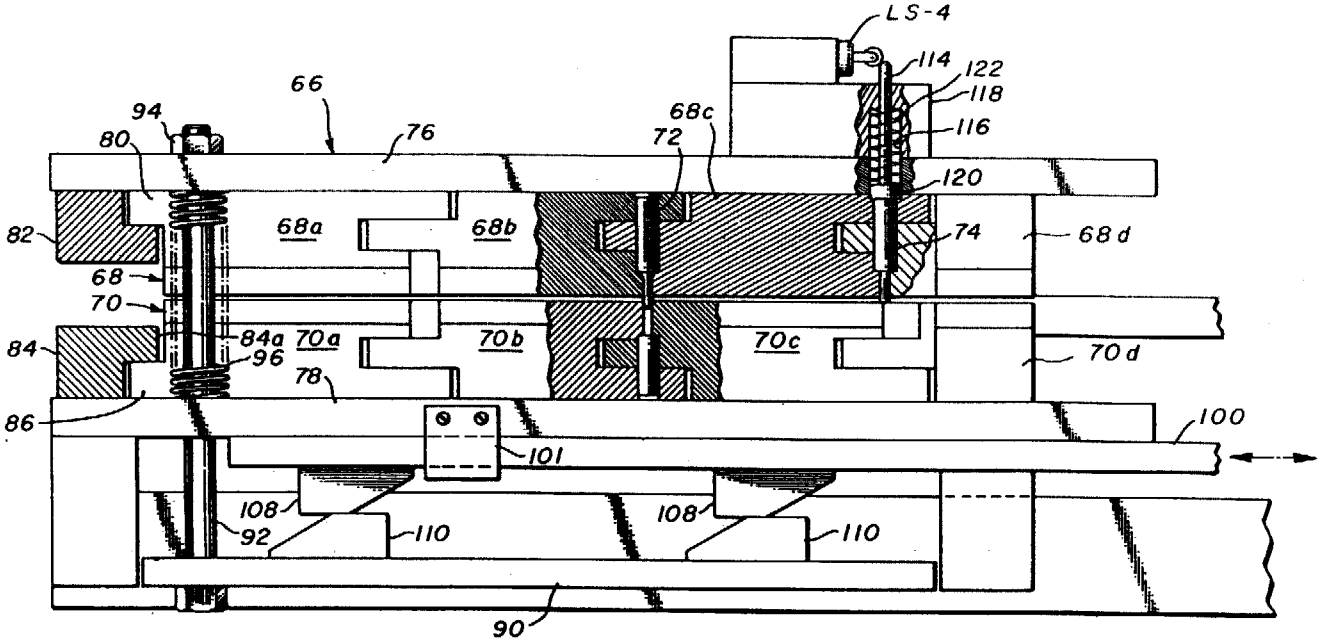
FIG. 8 is an enlarged side elevational view, partly in section and partly broken away, showing certain component features of the clamping and bending station of FIG. 7.

To provide precision edge bending of tape 10 midway between each set of adjoining barb clusters precisely at the location of the holes 24 formed between barb clusters, the clamping and bending station 38 features a cam operated clamping and bending tool 66 having multi-segmented articulated upper and lower matching jaws 68 and 70. These jaws 68, 70 are supported for relative clamping and unclamping or opening movements. In addition, each of the matching upper and lower jaw links or segments are supported for swinging movement in unision with one another with each matching set of downstream jaw segments being movable through an increased angular displacement relative to adjoining upstream jaw segments along arcuate paths of travel respectively about vertically extending axes. The segments of each jaw 68 and 70 are respectively connected for swinging movement relative to their adjacent segments by upright pivot pins such as shown at 72 and 74, e.g., in FIG. 8, which additionally serve to provide the above mentioned vertically extending axes between the articulated segments of each jaw. Pin 74 is the anchoring pivot point for the jaw segments.

Upper jaw 68 and lower jaw 70, are respectively mounted for swinging movement on a jaw clamping plate 76 and an underlying bed plate 78, the bed plate 78 being secured on support rails 52 of machine frame 30. Downstream jaw segment 68a of upper jaw 68 has a projecting upper end flange 80 and reduced thickness received in interposed relation between jaw clamping plate 76 and its attached arcuate jaw guide 82. Jaw guide 82 is shown as being of L-shaped cross section to provide a guideway for the flange 80 of jaw 68. By virtue of this construction, upper jaw 68 not only is provided controlled guidance during its swinging movements relative to the jaw clamping plate 76, but the upper jaw 68 is also suited to be carried in unison with the jaw clamping plate 76 responsive to its vertical reciprocating movements between operating positions.

An arcuate jaw guide 84 is similarly mounted on bed plate 78 with an upper lip 84a overlying a projecting flange 86 of reduced thickness at the end of downstream jaw segment 70a lower jaw 70 which is accordingly maintained in continuous control during swinging of the lower jaw 70 relative to bed plate 78.

Figure 9:
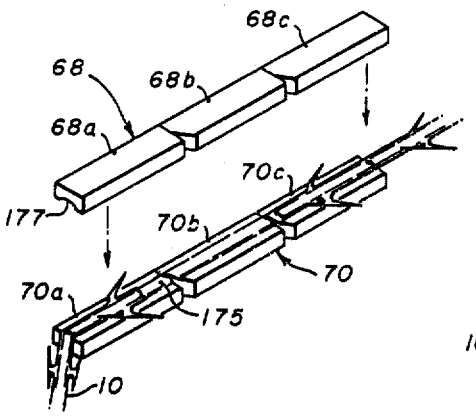
FIGS. 9–12 are schematic views illustrating different operating positions of jaws of the clamping and bending station of FIG. 7.

Upper and lower jaws 68, 70 may be driven from a relatively open, home position (FIG. 9) into relatively closed, clamped starting position (FIG. 10) to secure the crowned portion of tape 10 between the jaws. The tape barbs are received within clearances between jaws 68 and 70, and the matching sets of jaw segments in clamped, starting position are linearly aligned with the path of movement of stock 32 through machine 26.

Figure 10:
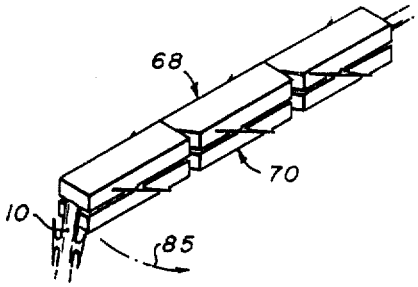
Figure 11:
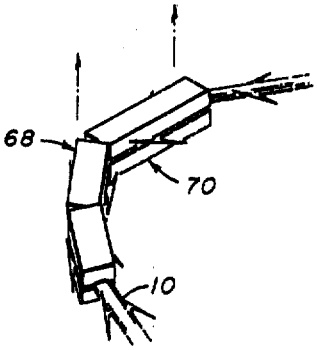

To edge bend the tape in the plane of the tape 10, the jaws 68, 70 may then be driven in unison with a swinging movement in a counterclockwise direction as shown by arrow 85 in FIG. 10 from starting position into an extended angular position illustrated in FIG. 11. During this movement, an upstream portion of tape 10 is securely retained in fixed clamped position between nonrotatable jaw segments 68d and 70d (FIG. 8) which are upstream of the swinging matching sets of jaw segments. Upon being moved into its extended position, upper jaw 68 is raised to unclamp and release the bent barbed tape 10, whereupon the upper and lower jaws 68, 70 are in a reversing position to be simultaneously returned in an open condition in a clockwise direction as shown by arrow 87 in FIG. 12 to home position.

For controlling jaw opening and closing, a jaw clamping control 88 is provided (FIG. 7) and includes a lower cam plate 90 mounted below bed plate 78. Lower cam plate 90 is supported for vertical reciprocating movement relative to the frame 30 between a lower clamping position (FIG. 8) and a raised release position. Bolts such as shown at 92 will be understood to be fixed at each corner of the lower cam plate 90 to extend upwardly through oversized openings, not shown, in the bed plate 78 and are secured by nuts such as at 94 to corresponding corners of jaw clamping plate 76. Return springs such as at 96 are coiled about each bolt 92, and opposite ends of springs 96 seat against bed plate 78 and the overlying jaw clamping plate 76. Actuation of lower cam plate 90 between raised and lowered positions effects corresponding movement of jaw clamping plate 76, and thus the upper jaw 68, between upper and lower operating positions.

To drive jaw clamping plate 76 and its upper jaw 68 into a lower closed clamping position to secure the barbed tape 10 in position between jaws 68 and 70 in their aligned starting position, an extendible and retractable piston rod 98 is drivingly connected to an upper cam plate 100 suitably supported on the frame 30 for reciprocation in a horizontal plane with upper cam plate 100 shown engaging the bottom of bed plate 78. For this purpose, cam plate 100 may be retained by gibs such as at 101 mounted (FIG. 8) on bed plate 78.

Figure 7:
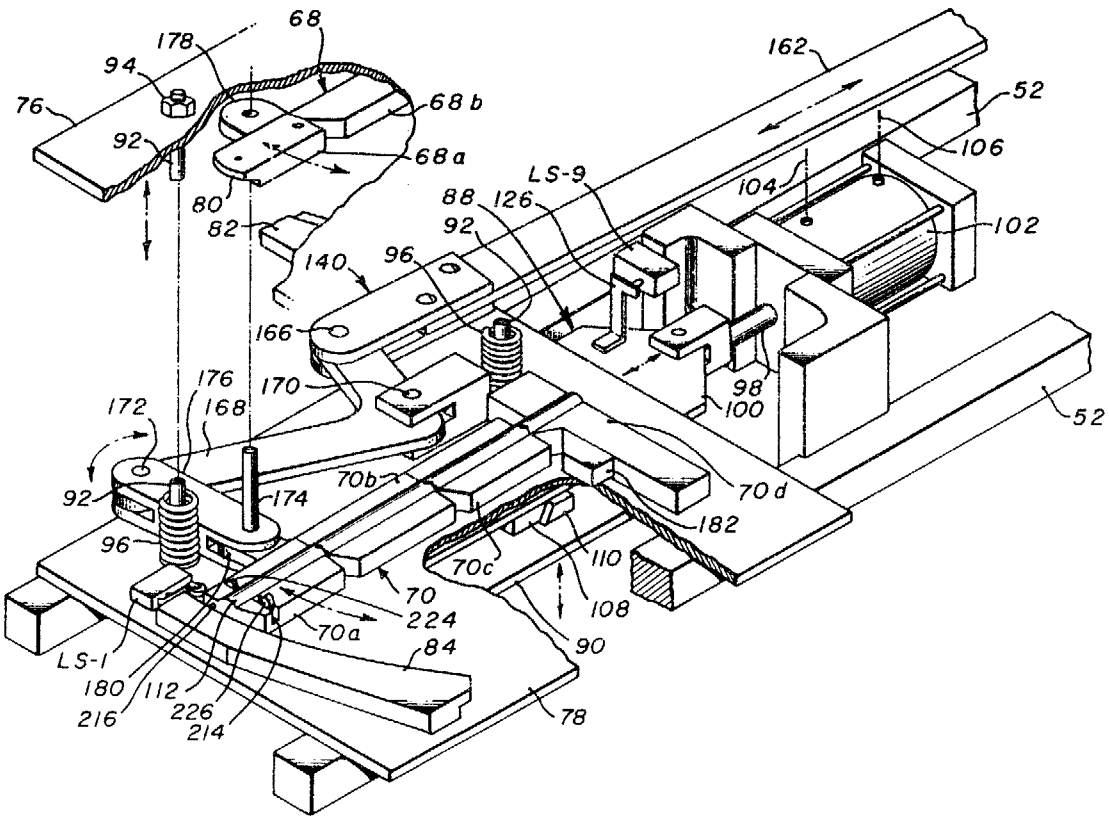
FIG. 7 is an enlarged exploded isometric view, partly broken away and partly in section, of a clamping and bending station of the machine of FIG. 5.

To move upper cam plate 100 between an extended starting position and a retracted operating position, a conventional double acting air operated cylinder 102 controlled by a suitable four-way valve, not shown, is power operated whereby supply air is fed through line 104 while line 106 is connected to exhaust to retract piston rod 98 from left to right as viewed in FIG. 7. Cams such as illustrated at 108 fixed on the bottom of the horizontally reciprocable upper cam plate 100 engage corresponding cams 110 secured in confronting relation on top of the vertically reciprocable lower cam plate 90. As upper cam plate 100 moves from left to right into its retracted position as viewed in FIG. 8, cams 108 and 110 cooperate to drive jaw clamping plate 76 and lower cam plate 90 downwardly against the biasing force of return springs 96.

Next, the articulated jaws 68 and 70 are driven while in closed clamped relation from their starting position (FIG. 10) into extended angular position (FIG. 11), and return movement of jaw clamping plate 76 into its raised release position is achieved by reversing the air supply and exhaust connections to lines 104 and 106 to drive piston rod 98 from right to left as viewed in FIG. 7 to move upper cam plate 100 from retracted position into its extended starting position, whereby cams 108 ride over cams 110 and return springs 96 drive the lower cam plate 90 and jaw clamping plate 76 into raised released position.

To assure proper alignment of barbed tape 10 between the open upper and lower jaws 68, 70 at the clamping and bending station 38 as the tape 10 is initially advanced into position to rest on the crown 112 of lower jaw 70 in its aligned home position, jaw pivot pin 74 is shown having an upwardly extending stem 114. Stem 114 projects through a spring chamber 116 and a reduced opening formed in communication with one another in the jaw clamping plate 76 and a switch mounting block 118. With the clamping and bending tool 66 in its starting position of FIG. 8, pin 74 is shown in normal operating position with an enlarged head 120 of pin 74 pressed downwardly by a spring 122 received within chamber 116 to serve as a pilot safety pin.

Should any misalignment occur upon jaw clamping plate 76 being driven downwardly from raised release position into its lower clamping position, pin 74 will not register with and enter the hole 24 in tape 10 but rather will contact its upper surface, causing pin 74 to be elevated against the bias of spring 122 to actuate a limit switch LS-4 mounted on block 118 to provide an electrical signal to the control circuit to automatically shut down the press.

During normal automatic operation, upon dwell of the indexing drive 44 and as rod 98 is withdrawn from extended starting position into retracted position upon operation of the air cylinder 102, a finger 126 fixed to upper cam plate 100 moves rearwardly into position to actuate a limit switch LS-9 to signal jaw clamp closure to logic controls in control box 130, whereby the control circuit causes the press to operate. The press ram 28 then downstrokes, and a drive actuator 132, located downstream of the forming station 36, is driven vertically downwardly by press ram 28 to actuate the clamping and bending tool 66. Drive actuator 132 has a cam 134 (FIGS. 12 and 14) which engages a complementary cam surface 136 on a horizontally reciprocable bend tool starter member 138 of a one-way rotary drive mechanism 140 for the clamping and bending tool 66.

The bend tool starter member 138 is supported on a fixed plate 142 for horizontal reciprocation along an axis in offset parallel relation to the linear path of movement of tape 10. More specifically, plate 142 is secured to support rails 52 and provides a base for a pair of fixed bearing blocks 144 spaced apart with internal grooves for receiving flanges 146, 146 projecting from opposite sides of the horizontally reciprocable starter member 138.

The drive mechanism further includes a pair of spaced parallel guide rods 148, 148 fixed to starter member 138 and extending rearwardly through aligned oversized openings, not shown, formed in a retaining block 150, fixed to plate 142, and in a rearwardly disposed mounting block 152. The mounting block 152 is supported on guide rods 148, 148 which extend rearwardly through a terminal mounting plate 154 with free ends of the rods 148, 148 being secured to the mounting plate 154 by nuts such as at 156. Return compression springs 158, 158 are coiled about each of the guide rods 148, 148 and seated against the retaining and mounting blocks 150 and 152. Auxiliary return compression springs 160, 160 are mounted intermediate guide rods 148, 148 on the outboard side of mounting block 152 and seated against the mounting block 152 and the terminal mounting plate 154. Main return springs 158, 158 and the axuiliary return springs 160, 160 cooperate to return starter member 138 into its illustrated starting position (FIG. 13) once press ram 28 returns the drive actuator 132 into its retracted position (FIG. 13).

Figure 13:
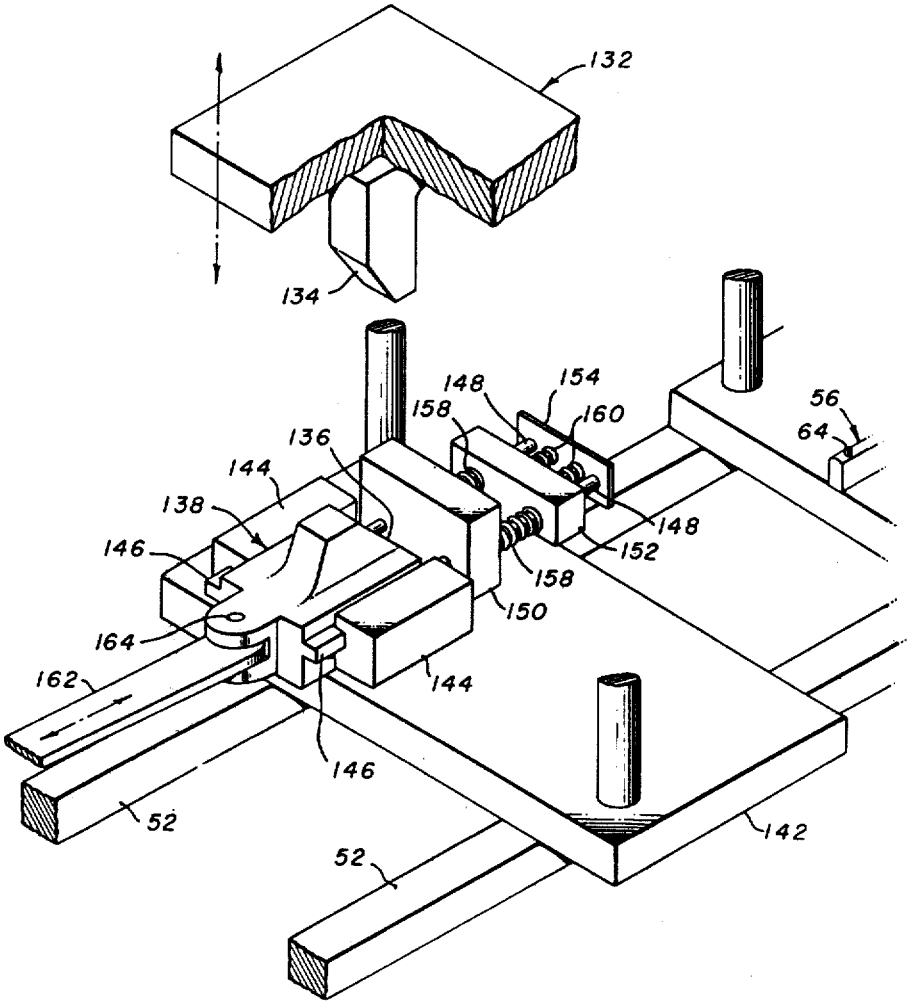
FIG. 13 is an enlarged isometric view, partly broken away and partly in section, showing a drive actuator and starter member of a one-way rotary drive mechanism of the clamping and bending station of FIG. 7.
Figure 14:
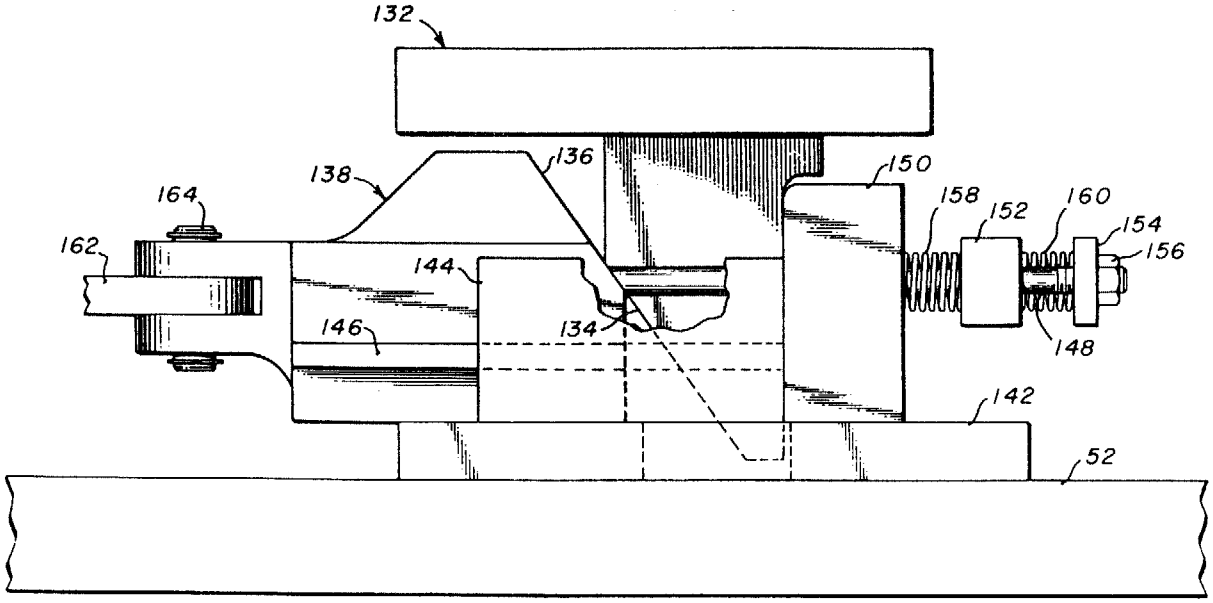
FIG. 14 is an enlarged side elevational view of the components of FIG. 13, partly broken away and partly in section, wherein the drive actuator and starter member are engaged in an operating position to effect edge bending of the tape at the clamping and bending station.

Upon engagement of cams 134, 136 upon downstroke of the press ram 28, starter member 138 is driven to the left of its starting position shown in FIG. 13 to a drive operating position shown in FIG. 14, to transmit a corresponding horizontal driving motion to an elongated arm 162 through pin 164. The imparted force to arm 162 is transmitted through pivot pin 166 (FIG. 7) to bell crank 168 supported for pivotal movement about pin 170 fixed to bed plate 78. Bell crank 168 is thus moved in a counterclockwise direction about pivot pin 170 as viewed in FIG. 7 and this angular driving motion is transmitted to the jaws 68, 70 by a pair of pivot pins 172 and 174 respectively connecting a drive link 176 to the bell crank 168 and to downstream jaw segments 68a and 70a.

A radial bend drive force is accordingly transmitted by pivot pin 174 to corresponding ears 178 and 180 on downstream jaw segments 68a and 70a to swing the jaws 68 and 70 in a counterclockwise direction. This drive force effects an angular movement to edge bend the barbed tape 10 in a horizontal plane, which will be understood to be that plane containing the longitudinally extending side edges of the crowned but substantially planar tape, about three vertical axes corresponding to the three pivot pins, between the articulated upper jaw segments, received in the three holes 24 formed at equally spaced intervals along the tape 10 within the jaws 68, 70.

As the tape is bent, it is firmly gripped with the tape crown 22 clamped between correspondingly curved projections 175 and recesses 177 respectively formed in the lower and upper jaws 68, 70. Such action keeps the barbed tape 10 firmly and continuously controlled as it is being bent to prescribed specifications along predetermined lengths between segments of the barbed tape. Thus, three adjoining linear segments 12 of the tape 10 are formed to a prescribed radial bend for creating a coil of prescribed diameter. The metal on the inside edge of the tape 10 is uniformly compressed adjacent each opening 24 to form dimples 204 of uniform configuration.

Figure 15:
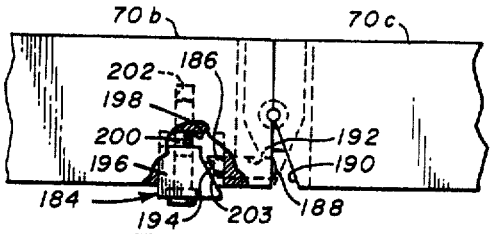
FIG. 15 is an enlarged plan view, partly broken away and partly in section, illustrating a clamping jaw adjustment feature for limiting the angular throw of articulated jaw segments of the clamping and bending station.

As best seen in FIGS. 7 and 15, the swinging movement of the jaws 68 and 70 is precisely adjusted to achieve a uniformly precise bend angle "A" between tape segments 12. A fixed stop 182 is selectively mounted in adjusted position by any suitable means on the bed plate 78 to engage and terminate the swinging movement of the matching upstream jaw segments 70c and 68c.

The intermediate matching jaw segments 70b and 68b move through an angular displacement, greater than that of upstream jaw segments 70c and 68c, to an extent determined by a limit stop 184 best illustrated in FIG. 15. It is to be understood that a stop such as at 184 may be provided for each of the adjoining segments of the upper and lower jaws 68 and 70 downstream of segments 68c and 70c to adjustably terminate the angular throw of the articulated jaw segments. However, it will suffice to describe the jaw stop adjustment control in connection with the intermediate lower jaw segment to achieve the desired bend radius of the intermediate segment 12 of the tape 10 gripped within the jaws.

Specifically, stop 184 features a plunger 186 having an exposed head 188 which serves as an abutment engageable with a confronting beveled end wall such as at 190 serving as a joining stop surface on the adjoining upstream jaw segment 70c. Plunger 186 is mounted within a cavity 192 in intermediate jaw segment 70b and is in captured relation between the beveled end wall 190 and an inclined surface 194 of an adjusting shoe 196. Adjusting shoe 196 is precisely located within a chamber 198 in intermediate jaw segment 70b by an adjustment screw 200 extending through the shoe 196 and threadably connected to an internally threaded bore 202 communicating with chamber 198 within jaw segment 70b.

Accordingly, it will be seen that head 188 of plunger 186 may be selectively positioned for abutting engagement with the upstream jaw segment 70c to precisely terminate the swinging movement of jaw segment 70b at a desired bend angle A in accordance with the predetermined positioning of shoe 196 as established by the adjustment screw 200, whereby the surface 194 is in mating abutment with a matching inclined terminal end 203 of plunger 186 to serve as an adjustable stop therefor.

A similar jaw stop adjustment control, not shown, is provided for downstream jaw segments 68a and 70a to effect an adjustable stop which may be readily and precisely located to selectively establish the extended angular position of the downstream jaw segments and, thus, a precisely controlled radial bend on each segment 12 of barbed tape 10 in the clamping and bending station 38.

From this description, it will be seen that the downstream matching jaw segments 70a and 68a move through an angular displacement greater than that of intermediate jaw segments 70b and 68b. By virtue of the jaw stop adjustment control feature, the angular offset or displacement between adjoining downstream and upstream jaw segments in the extended angular position of jaws 68, 70 is precisely uniform to achieve the desired equal bend angle A between adjoining tape segments 12 (FIG. 1).

The following summary of machine operation does not specifically describe details of various controls, logic circuitry and piping arrangements located in control box 130 and which have been found to work satisfactorily. Obviously, a variety of different circuits and controls may be employed in accordance with conventional techniques to effect machine operation on manual, semi-automatic and automatic sequencing. However, it is believed that the following explanation of certain control features with reference to the foregoing description of the mechanical components and their functions will provide a clear understanding of this invention.

In operation, the leading end of strip stock is fed into the machine 26 under manual operating control, and the press is operated to advance strip stock 32 and to sequentially blank and upset barbs on the blanked strip through the blanking and forming stations 34, 36 of the press. Manual cycling may be repeated until barbed tape 10 has been advanced into the clamping and bending station 38. Suitable adjustments are made if necessary to ensure that the required radial bend is effected on each segment 12 of the barbed tape 10 which is fed into position on takeup reel 42 to be formed into a coil. Thereafter the machine may be operated automatically.

Limit switch LS-2, upon being actuated, causes indexing drive 44 to clamp and drive strip stock 32 into strip release position 47 during an advance stroke. Advance stroke of the indexing head 46 engages limit switch LS-3 which signals the control circuit to cause the indexing head 46 to release the stock 32 and return head 46 in an open condition to its ready clamp position and to activate the jaw clamping control 88 to close jaws 68, 70 into starting position, provided that the clamping and bending tool 66 is in home position as sensed by limit switch LS-1 (FIG. 7). Upon jaw closure, alignment of the tape 10 within the clamping and bending station is sensed as described above by pilot pin 74.

As an added control feature, bending station 38 also provides for precise axial alignment of tape 10 relative to jaws 68, 70 during each machine cycle. A lever arm 212 will be understood to be mounted in transversely extending relation to lower jaw segment 70a in a slot 214 (FIG. 7) for swinging movement about pivot pin 216. Pin 216 is secured parallel to a longitudinal axis of jaw segment 70a. A lever actuating plunger 218 is mounted on pin 220 fixed to jaw segment 68a. Pin 220 has a depending enlarged diameter end which fits within a correspondingly enlarged bore 222 of plunger 218. Bore 222 has a reduced diameter portion receiving the stem of pin 220.

Figure 16:
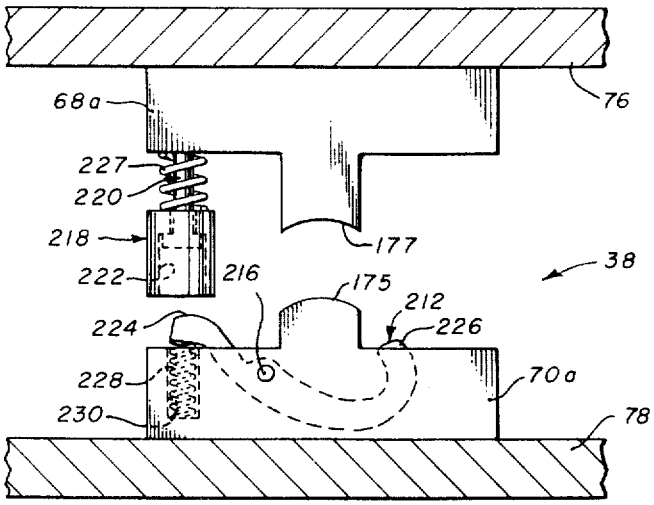
FIG. 16 is an enlarged elevational view, partly broken away, of a tape control feature of the bending station in a jaw opening position.
Figure 17:
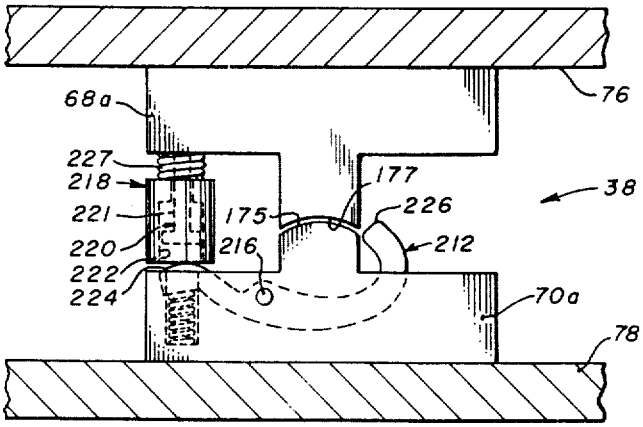
FIG. 17 is a view similar to FIG. 16 showing its components in a jaw closed position.

A foot 224 of lever 212 is aligned with overlying plunger 218 in the home position (FIG. 9) of the open jaws 68, 70. Upon jaw closure, jaws 68, 70 move from home position (FIGS. 9 and 16) into starting position (FIGS. 10 and 17). At this time, foot 224 of lever 212 is driven downwardly by plunger 218 to pivot lever 212 in a counterclockwise direction (as viewed in FIGS. 16 and 17) to swing finger 226 of lever 212 into engagement with a following length of tape 10 in the event of its being angularly misaligned in the direction of tape bending relative to jaws 68, 70. This action returns tape 10 into precise alignment with jaws 68, 70 upon jaw closure.

Upon completion of each cycle after jaws 68, 70 are thrown from extended angular position (FIG. 11) into reversing position (FIG. 12) with jaws 68, 70 being opened, plunger 218 and lever 212 are respectively returned from an operative position (FIG. 17) to an inoperative position (FIG. 16) by a pair of springs 227 and 228. Spring 227 is shown coiled about the stem of pin 220 with opposite ends of the spring 227 being seated on jaw segment 68a and the top of plunger 218. Spring 228 is mounted in a spring chamber 230 of lower jaw segment 70a.

Thereafter, with tape 10 properly aligned, the normally open switch LS-9 is closed when the upper cam plate 100 has traversed the distance required to clamp the barbed tape 10 in station 38, signalling the press to downstroke. This action simultaneously closes the blanking dies 50, 54 and the forming dies 56, 62 and drives the drive actuator 132 downwardly. At this time, three barb clusters are blanked on the strip stock 32 in the blanking station 34; the barbs of three clusters are upset in the forming station 36; and the one-way rotary drive mechanism 140 swings the three matching segments of the upper and lower jaws 68, 70 through their arcuate path of movement from starting position to their extended angular position to edge bend the barbed tape 10 into angularly offset segments 12 to provide a precisely formed coil of prescribed dimension. It is to be noted that the bending action causes uniform dimples 204 to be precision formed at the juncture between tape segments 12, and these dimples 204 additionally promote stacking of the turns of the tape 10 into a uniform coil.

Figure 12:
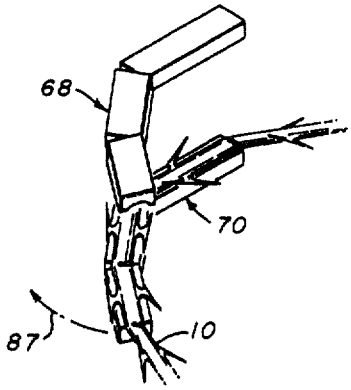

At the completion of the above steps upon the press ram 28 reaching its maximum throw on its downstroke, limit switch LS-5 (FIG. 5) mounted on frame 30 engages a cam mounted on a plate 206 supported on press ram 28 to momentarily close switch LS-5 and send an electrical signal through the control circuit to open the radial bend tool 66. This signal from switch LS-5 causes the air supply and exhaust connections in lines 104, 106 to the air cylinder 102 to be reversed, and the jaws 68, 70 of the radial bend tool 66 are opened upon return of the upper cam plate 100 into extended starting position responsive to extension of the piston rod 98. The jaw clamping plate 76 and the lower cam plate 90 are returned to raised positions under the force of the return springs 96 upon the upstroke of the press ram 28, thereby moving jaws 68, 70 into reversing position (FIG. 12).

At this time in the operating cycle as the ram 28 is moving upwardly to retract the cam 134 of the drive actuator 132 and the rotary drive mechanism 140 is returned to its home position under the bias of return springs 158 and 160, continuing upward movement of the press ram 28 causes the cam carried by plate 206 on press ram 28 to engage limit switch LS-2, sending a pulse through the control circuit to cause the automatic strip indexing drive 44 to clamp and advance the strip stock 32 for the next cycle and to repeat the above-described sequence of operating steps.

In summary, the above described machine and method is particularly adapted to provide in sequence, either automatically or semi-automatically, for feeding strip into in-line work stations for blanking and forming barbs at equally spaced intervals along a longitudinally extending edge of the strip with a series of pilot and bend forming openings being provided at equally spaced intervals along a longitudinal axis of the strip intermediate the barbs. The pilot and bend forming openings are of significant utility in ensuring high quality, uniform bends between tape segments and in positioning the strip in the machine, particularly its forming station and its clamping and bending station. In the clamping and bending station the apertured strip is clamped by the jaws and the matching swinging jaw segments operate to edge bend the clamped strip in the plane of the strip adjacent each opening to form the strip into angularly displaced adjoining linear segments each of which are angularly offset in a uniform angular direction and equal bend angle in relation to the trailing segment. Significant advantages are provided by the machine and method of this invention, notably the ability to form metal stock of various types into compact collapsible coils with precise uniform turns for optimum nesting of each oil. These advantages are achieved by the unique edge bending technique disclosed wherein the strip is bent about uniform holes of equal diameter such that metal flows consistently to stretch along the outside edge and compress along the inside strip edge adjacent the opening to self-temper, full harden the surrounding metal to form dimples of uniformly consistent configuration. Such a method and construction provides controlled metal flow for controlling the individual bends between adjoining segments and therefor the turns of the coil for uniformly controlled nesting with even the dimples in aligned relation to confronting dimples of adjacent turns of the coil.

As will be apparent to persons skilled in the art, various modifications, adaptations and variations of the foregoing specific disclosure can be made without departing from the teachings of this invention.

I claim:

1. A method of making a coil from a strip of metal stock and comprising the steps of providing a substantially planar linear strip of metal stock, forming spaced openings along a longitudinal axis of the strip, positioning the strip by means of its openings for subsequent edge bending, and edge bending the strip in the plane of the strip adjacent its opening to form the strip into angularly displaced adjoining linear segments.

2. The method of claim 1 wherein the forming step includes forming the openings in equally spaced relation along a central longitudinal axis of the strip, and wherein the edge bending step includes edge bending the strip adjacent each of said openings to form the strip into adjoining linear segments of equal length.

3. The method of claim 2 wherein the edge bending step includes angularly deforming the strip in the plane of the strip in one angular direction adjacent each of said openings to uniformly offset the linear segments at equal bend angles relative to their respective trailing segment to form successive turns of a coil collapsible into compact nesting relation to one another.

4. The method of claim 1 wherein the forming step includes forming openings in equally spaced relation along a longitudinal axis of the strip with each opening of identical diameter, and wherein the edge bending step includes stretching metal along an outside strip edge adjacent each opening and compressing metal adjacent each opening on an inside strip edge to work harden the metal surrounding the opening and to form dimples of uniformly consistent configuration for uniformly controlled stacking of turns of the coil.

5. The method of claim 1 further including the step of feeding a following length of linear strip for a repetitive sequence of identical forming, positioning and edge bending steps to make a coil of identical turns with adjoining linear segments each being of equal length and offset at a common bend angle in relation to its railing segment.

6. The method of claim 1 wherein the forming and edge bending steps are performed simultaneously on spaced upstream and downstream portions of the strip respectively.

7. The method of claim 6 wherein the positioning step is intermittently performed in alternating timed relation to the forming and edge bending steps.

8. The method of claim 1 further including the steps of blanking barbs on a longitudinally extending edge of the strip at equal intervals thereon spaced apart from said openings, and upsetting the barbs into inclined relation to the plane of the strip.

9. The method of claim 8 wherein the blanking, forming and barb upsetting steps are performed in unison on the strip before the edge bending step.

10. The method of claim 1 further including the step of deforming the strip transversely before the edge bending step to define a longitudinally extending crowned upper surface having a convex cross section.

11. The method of claim 1 further including the step of providing a pair of matching articulated jaws each having an upstream jaw segment, a downstream swinging jaw segment and a connecting pivot joint therebetween, and wherein the positioning step includes positioning the strip by registering connecting pivot joints of the matching sets of jaw segments with a strip opening before the edge bending step.

12. The method of claim 11 wherein the edge bending step is effected by clamping the jaws in gripping relation to the strip and pivoting the matching set of swinging jaw segments about an axis disposed in perpendicular relation to the clamped strip and extending through an opening therein and through corresponding connecting pivot joints of the jaws.

13. A method of making a coil of barbed tape from a strip of metal stock and comprising the steps of providing a substantially planar linear strip of metal stock, providing a path of movement for intermittently feeding the strip axially of a central longitudinal axis of the strip, blanking longitudinally spaced barbs at equal intervals on at least one edge of the strip by trimming metal from said edge at a blanking station, forming equally spaced openings along the central longitudinal axis of the strip in longitudinally spaced relation to the barbs, upsetting the barbs at a forming station into inclined relation to the plane of the strip, and edge bending the strip in one angular direction at a bending station in the plane of the strip adjacent its openings to form the strip into barbed tape having adjoining linear segments of equal length uniformly offset at equal bend angles relative to their respective trailing segment.

14. The method of claim 13 further including the step of positioning the strip by means of its openings for subsequent edge bending.

15. The method of claim 13 further including the step of positioning the strip by means of its openings for subsequent barb upsetting.

16. The method of claim 13 wherein the blanking step provides for blanking equally spaced barb clusters on the strip with each cluster comprising two barb pairs on opposite edges of the strip with the barbs of each pair extending generally parallel to the central longitudinal axis of the strip.

17. The method of claim 16 wherein the barb upsetting step includes upsetting each barb cluster with opposite barb pairs on opposite edges of the strip being reversely inclined to one another relative to the plane of the strip.

18. The method of claim 13 including a further step of deforming the strip transversely of its central longitudinal axis in the forming station to define a longitudinally extending crowned upper surface having a convex cross section.

19. The method of claim 13 wherein the edge bending step bend each segment of the strip through a uniform angle offset relative to its adjoining upstream segment in a common angular direction to form the strip into turns of a coil having adjoining linear segments of equal length offset at identical bend angles with respect to their trailing segment.

20. The method of claim 13 wherein the bending step includes the step of simultaneously bending the strip into a plurality of segments in unison with the steps of blanking, forming and barb upsetting performed on a portion of the strip upstream of the bending station, and wherein the further step is included of intermittently indexing the strip to simultaneously feed it into the blanking, forming and bending stations in alternating timed relation to the blanking, forming, barb upsetting and bending steps.

21. The method of claim 13 further including the step of stacking the barbed tape downstream of the bending station into a coil of turns of barbed tape with the tape in an axially stacked arrangement with each segment of the tape including its barbs in confronting nested relation to corresponding segments of adjacent turns of the tape.

22. A machine for making a coil of metal tape from a substantially planar linear strip of flat metal stock and comprising means for forming spaced openings along a longitudinal axis of the strip, and a pair of jaws mounted for movement toward and away from one another between relatively closed and open positions for releasably clamping the apertured strip, the jaws being articulated jaws having matching jaw segments supported for relative swinging movement for edge bending the clamped strip in the plane of the strip adjacent its opening to form the strip into angularly displaced adjoining linear segments.

23. The machine of claim 22 further including jaw clamping control means for opening and closing the jaws, and a rotary drive for driving the matching swinging jaw segments in unison with one another with a swinging movement between a starting position, wherein the jaw segments are in closed aligned relation, and an extended angular position wherein the jaws are closed with their matching swinging jaw segments in misaligned relation to adjoining segments of their respective jaws to effect said edge bending of the clamped strip.

24. The machine of claim 23 wherein the rotary drive includes return spring means and a one-way rotary drive mechanism for moving the jaws in one angular direction from starting position to extended angular position and for loading the return spring means, the return spring means urging the jaws in the opposite angular direction for returning the jaws into aligned relation responsive to the jaw clamping control means opening the jaws.

25. The machine of claim 23 further including indexing means for intermittently feeding successive lengths of strip into position between the jaws upon the jaws being returned by the return springs from a reversing position, wherein the jaw segments are in open, extended angular misaligned relation, to a home position wherein the jaws are in open aligned relation.

26. The machine of claim 25 wherein the jaw clamping control means includes a power operator for driving the jaws from extended angular position into reversing position to release edge bent segments of the strip and for moving the jaws from home position into starting position to clamp the next successive length of strip to be edge bent into angularly displaced linear segments.

27. The machine of claim 22 including a frame, a plurality of work stations mounted on the frame including a blanking station and a bending station downstream of the blanking station, and indexing means for intermittently feeding metal strip along a feed path to the work stations, said strip opening forming means being operatively mounted in the blanking station for forming said spaced openings in the strip at equally spaced intervals, and the articulated jaws being operatively mounted in the bending station.

28. The machine of claim 27 wherein the blanking station further includes the means in the strip feed path for forming barbs along an edge of the strip between its strip openings with the barbs being located at equally longitudinally spaced intervals along the strip edge intermediate its openings.

29. The machine of claim 28 wherein the working stations further include a forming station between the blanking station and the bending station, the forming station including second die means in the strip feed path for upsetting the barbs into inclined relation to the plane of the tape.

30. The machine of claim 29 wherein the first and second die means of the blanking and forming stations respectively include a fixed die located in the strip feed path and a movable die reciprocable along an axis perpendicular to the strip feed path between an open inoperative position and a closed operative position.

31. The machine of claim 30 wherein a drive actuator for the bending station is mounted for reciprocable movement between an inoperative position and a drive operating position, movement of the drive actuator from inoperative position into its drive operating position serving to effect said angular movement of the matching swinging jaw segments for edge bending the clamped strip.

32. The machine of claim 31 further including power means for driving the drive actuator and the movable die of the first and second die means of the blanking and forming stations in unison, respectively, into drive operating position and into closed operative positions during dwells between movements of the intermittently operated indexing means.

33. The machine of claim 27 wherein the bending station further includes positioning means registrable with the strip openings for positioning the strip with its strip openings between articulating joints of each set of matching jaw segments.

34. The machine of claim 33 wherein the jaws each include pivot joints connecting adjoining segments of the respective jaws for relative swinging movement, at least one of the pivot joints of a matching set of jaw segments being mounted for movement perpendicular to the plane of the strip toward and away from a normal operating position in registration with a strip opening upon clamping the apertured strip with the jaw segments in a closed aligned starting position for establishing precision positioning of the strip between the jaws for precisely edge bending the strip adjacent its opening in the plane of the strip.

35. The machine of claim 22 further including means upstream of the jaws for transversely deforming the strip with a convex cross section to provide a strip having a longitudinally extending crowned upper surface.

36. The machine of claim 34 wherein the jaws have mating longitudinally extending, projecting and recessed portions corresponding to the crowned configuration of the strip for firmly securing the same in clamped engagement between the jaws for controlled edge bending of the strip into angularly displaced adjoining linear segments.

37. The machine of claim 22 wherein the jaws include selectively adjustable stop means for terminating angular movement of the matching swinging jaw segments relative to adjoining upstream segments of their respective jaws for precision control of a bend angle to be formed between adjoining linear segments of the strip during edge bending.

38. A machine for making a coil of metal tape from a substantially planar linear strip of flat metal stock and comprising indexing means for intermittently feeding successive lengths of strip along a linear strip feed path aligned with a longitudinally extending axis of the strip, a plurality of work stations disposed in the strip feed path including a blanking station, a forming station, and a bending station in progressively disposed downstream relation to each other, the blanking station having die means for trimming metal from at least one edge of the strip to define equally spaced barbs on said one edge and for forming openings in the strip on its central longitudinally extending axis with the openings located in equally spaced relation intermediate the barbs, the forming station having die means therein for upsetting the barbs into inclined relation to the plane of the strip, and the bending station having multi-segmented, articulated releasable clamping jaws with matching jaw segments supported for relative swinging movement between a starting position aligned with the strip feed path and an extended angular position, wherein the matching jaw segments are in misaligned relation to adjoining segments of their respective jaws, for edge bending the clamped strip in the plane of the strip adjacent its openings to form the strip into angularly displaced adjoining linear segments of equal length.

39. The machine of claim 38 wherein the jaws each have pivot pins extending perpendicular to the plane of the strip and interconnecting adjoining segments of the respective jaws for relative swinging movement, at least one pivot pin being mounted for axial movement toward and away from a normal operating position in registration with a strip opening, upon clamping the apertured strip with the jaw segments in closed aligned relation, for establishing uniform positioning of the strip between the jaws for precision edge bending of the strip in the plane of the strip.

40. The machine of claim 39 further including signalling means for signalling an improperly positioned strip in the bending station, said one pivot pin being engageable with said signalling means to actuate the same upon engagement of said pin with the strip to drive the pin away from its said normal operating position.

41. The machine of claim 38 further including selectively adjustable stop means cooperating with the relatively movable jaw segments for selectively establishing angular displacement of the matching swinging jaw segments relative to adjoining upstream jaw segments of their respective jaws for precisely controlling and forming a uniform bend angle between adjoining linear segments of the strip during edge bending.

42. The machine of claim 38 further including a power operator drivingly connected to the jaws for opening and closing the same, a one-way rotary drive mechanism drivingly connected to a downstream matching set of swinging jaw segments for moving the jaws in unison in one angular direction from a starting position, wherein the jaw segments are in closed aligned relation, to said extended angular position wherein the jaws are closed in misaligned relation to adjoining segments of their respective jaws, the jaws being movable by the power operator from extended angular position into a reversing position, wherein the jaw segments are in open, extended angular misaligned relation for releasing edge bent segments of the strip, and return spring means drivingly connected to the jaws for urging the same in the opposite angular direction for returning the jaws into a home position wherein the jaws are in open aligned relation in condition to be driven by the power operator into starting position to clamp the next successive length of strip into angularly displaced linear segments.

43. A machine for making a coil of metal tape from a flat strip of metal stock and comprising [means for forming spaced openings along a longitudinal axis of the strip,] a pair of nonrotatable jaws for releasably clamping the strip [on an upstream side of one strip opening], a second pair of rotatable jaws for releasably clamping the strip on a downstream side of said [one strip opening] *first pair of jaws*, and drive means for swinging said second pair of jaws relative to the first pair of jaws for edge bending the clamped strip in the plane of the strip [about its opening] to form the strip into angularly displaced linear segments, *die means for forming barbs on at least one edge of the strip.*

44. The machine of claim 43 further including tape registering means movable between an inoperative position and an operative position, the tape registering means in operative position being engageable with tape misaligned relative to said second pair of jaws in open position for precision alignment of the tape relative to the jaws for subsequent clamping thereof on a downstream side of said [one strip opening] *first pair of jaws.*

45. [The machine of claim 44 wherein the tape registering means includes a lever operatively mounted on one of said pair of rotatable jaws and a lever actuator being mounted on the other of said pair of rotatable jaws, and wherein the movement of said second pair of jaws into clamping engagement serves] *A machine for making a coil of metal tape from a flat strip of metal stock and comprising a pair of nonrotatable jaws for releasably clamping the strip, a second pair of rotatable jaws for releasably clamping the strip on a downstream side of said first pair of jaws, and drive means for swinging said second pair of jaws relative to the first pair of jaws for edge bending the clamped strip in the plane of the strip to form the strip into angularly displaced linear segments, tape registering means movable between an inoperative position and an operative position, the tape registering means in operative position being engageable with tape misaligned relative to said second pair of jaws in open position for precision alignment of the tape relative to the jaws for subsequent clamping thereof on a downstream side of the first pair of jaws, the tape registering means including a lever operatively mounted on one of said pair of rotatable jaws and a lever actuator being mounted on the other of said pair of rotatable jaws, the movement of said second pair of jaws into clamping engagement serving* to operate the lever actuator to drive the tape registering means from inoperative to operative position.

46. A method of making a coil from a strip of metal stock and comprising the steps of providing a strip of metal stock, [forming spaced openings along a longitudinal axis of the strip,] clamping a portion of the strip [on an upstream side of one strip opening], and edge bending the strip in the plane of the strip [about its opening] on a downstream side of [said one opening] *the clamped portion of the strip* to form the strip into angularly displaced adjoining linear segments, *and blanking barbs on at least one longitudinally extending edge of the strip.*

47. [The method of claim 44 further including the step of] *A method of making a coil from a strip of metal stock and comprising the steps of providing a strip of metal stock, clamping a portion of the strip, edge bending the strip in the plane of the strip on a downstream side of the clamped portion of the strip to form the strip into angularly displaced adjoining linear segments, forming spaced openings along a longitudinal axis of the strip, and* positioning the strip by means of its openings for subsequent edge bending.

*48. The method of claim 46 further including the step of feeding a following length of linear strip for a repetitive sequence of identical clamping and edge bending steps to make a coil of identical turns with adjoining linear segments each being of equal length and offset at a common bend angle in relation to its trailing segment.*

* * * * *

UNITED STATES PATENT AND TRADEMARK OFFICE

CERTIFICATE OF CORRECTION

PATENT NO. : Re. 30,814

DATED : December 8, 1981

INVENTOR(S) : Michael R. Mainiero

It is certified that error appears in the above—identified patent and that said Letters Patent is hereby corrected as shown below:

Column 8, line 39, wherein the word "axuiliary" should be --auxiliary--;

Column 15, line 30, wherein "the means" should be --die means--.

Signed and Sealed this

*Ninth* Day of *March 1982*

[SEAL]

*Attest:*

GERALD J. MOSSINGHOFF

*Attesting Officer*

*Commissioner of Patents and Trademarks*

REEXAMINATION CERTIFICATE (1301st)

United States Patent [19] [11] B1 Re. 30,814

Mainiero [45] Certificate Issued Jun. 12, 1990

[54] APPARATUS AND METHOD FOR FORMING BARBED TAPE

[75] Inventor: Michael R. Mainiero, Monroe, Conn.

[73] Assignee: American Fence Company, Inc., Phoenix, Ariz.

Reexamination Request:
No. 90/001,701, Jan. 27, 1989

Reexamination Certificate for:

| | |
|---|---|
| Patent No.: | **Re. 30,814** |
| Issued: | **Dec. 8, 1981** |
| Appl. No.: | **48,072** |
| Filed: | **Jun. 13, 1979** |

Related U.S. Patent Documents

Reissue of:

| | |
|---|---|
| [64] Patent No.: | **4,028,925** |
| Issued: | **Jun. 14, 1977** |
| Appl. No.: | **679,326** |
| Filed: | **Apr. 22, 1976** |

Certificate of Correction issued Mar. 9, 1982.

[51] Int. Cl.[5] ..... B21F 25/00; B21D 28/04

[52] U.S. Cl. ..... 72/294; 72/307; 72/308; 72/335

[56] References Cited

U.S. PATENT DOCUMENTS

| | | | |
|---|---|---|---|
| 530,203 | 12/1894 | Raymond . | |
| 704,521 | 7/1902 | Dolan et al. | 72/310 |
| 1,040,745 | 10/1912 | Olson | 72/310 |
| 1,628,581 | 5/1927 | Dinkel . | |
| 2,316,049 | 4/1943 | Connor | 153/39 |
| 2,948,049 | 8/1960 | Wilson | 140/58 |
| 3,017,914 | 1/1962 | Fuchs, Jr. | 153/20 |
| 3,463,455 | 8/1969 | Meckel | 256/8 |
| 3,916,958 | 11/1975 | Uhl | 140/58 |
| 3,952,572 | 4/1976 | Mergler et al. | 72/298 |
| 4,335,758 | 6/1982 | Williams | 140/88 |

OTHER PUBLICATIONS

Engineering Drawing 13220E0889, Rev. J, Bearing date "05 Jun. 1978", Entitled Tape, Barbed Coil A, Bearing Bates No. 20009.

Engineering Drawing 13220E2744, Rev. J, Bearing Date "05 Jun. 1978", Entitled Tape, Barbed, Coil B, Bearing Bates No. 200010.

Engineering Drawing 13220E8351, Rev. D, Bearing Date "27 Apr. 78", Entitled Barbed Tape Obstacle, General Purpose Stainless Steel, Bearing Bates No. 200011.

Engineering Drawing 13220E0889, Rev. J, Bearing Date "05 Jun. 1978", Entitled Tape, Barbed, Coil A, Bearing Bates No. 200012.

Engineering Drawing 13220E0889, Rev. J, Bearing Date "05 Jun. 1978", Entitled Tape, Barbed, Coil A, Bearing Bates No. 200013.

Engineering Drawing 13220E2744, Rev. J, Bearing Date "05 Jun. 1978", Entitled Tape, Barbed Coil B, Bearing Bates No. 200015.

Engineering Drawing 13220E8351, Rev. E, Bearing Date "22 Jun. 78", Entitled Barbed Tape Obstacle, General Purpose Stainless Steel, Bearing Bates No. 200016.

Technical Data Package List TL-MIL-B-52775 for Top Assembly Drawing TA 13220e8351, Bearing Date "9 Sep. 1976"; Bearing Bates No. 200018.

Brochure entitled "Barbed Tape", Prepared by Teledyne Mechanical Products of South El Monte, Calif.

Arthur Thomas Stanley, General Purpose Barbed Tape Obstacle, USAMERDC Report 1926, Fort Belvoir, Va.-Apr. 1968.

Arthur Thomas Stanley, General Purpose Barbed Tape Obstacle, USAMERDC Report 2106, Fort Belvoir, Va-Jul. 1974.

Arthur Thomas Stanley, Barrier Potential of Chain Link Fence, USAMERDC Report 2106, Fort Belvoir, Va-Jul. 1974.

*Primary Examiner*—Lowell A. Larson

*Attorney, Agent, or Firm*—Marvin A. Glazer; William C. Cahill

[57] ABSTRACT

A machine having blanking, barb forming and bending stations is provided for making a coil of metal tape from a substantially planar linear strip of metal stock wherein such strip is fed in sequence to the stations in a single pass through the machine to respectively edge notch the strip into barbs, upset the barbs into inclined relation to the plane of the strip and then edge bend the strip in the plane of the strip to form it into identically angularly displaced adjoining linear segments of equal length to make a generally annular coil of barbed metal tape.

The method of this invention features forming spaced openings along a longitudinal axis of a substantially planar linear strip of metal stock, positioning the strip by means of its openings and edge bending the strip in the plane of the strip adjacent its openings to form the strip into a coil having identical angularly displaced adjoining linear segments.

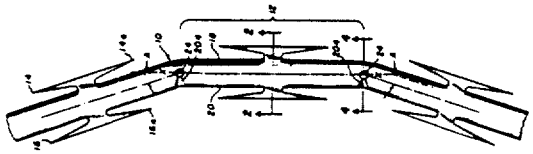

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4, 11, 12 and 22–45 is confirmed.

Claims 1–3, 5–10, 13–21 and 46–48 are cancelled.

* * * * *